United States Patent [19]
Glitho et al.

[11] Patent Number: 6,041,327
[45] Date of Patent: Mar. 21, 2000

[54] IMPLEMENTATION OF NOTIFICATION CAPABILITIES IN RELATIONAL DATABASES

[75] Inventors: Roch Glitho, Montreal; Mario Banville, Pointe Claire, both of Canada

[73] Assignee: Telefonaktiebolaget LM Ericsson, Stockholm, Sweden

[21] Appl. No.: 08/989,944

[22] Filed: Dec. 12, 1997

[51] Int. Cl.⁷ .................................................. G06F 17/30
[52] U.S. Cl. ............................... 707/10; 707/1; 707/104
[58] Field of Search ................................. 707/1, 10, 104; 395/200.31, 200.33, 200.47, 200.48, 200.49

[56] References Cited

U.S. PATENT DOCUMENTS

| | | | |
|---|---|---|---|
| 4,812,843 | 3/1989 | Champion, III et al. | 340/905 |
| 5,592,664 | 1/1997 | Starkey | 707/1 |
| 5,781,737 | 7/1998 | Schmidt | 395/200.56 |
| 5,799,317 | 8/1998 | He et al. | 707/104 |
| 5,805,886 | 9/1998 | Skarbo et al. | 395/685 |
| 5,819,281 | 10/1998 | Cummins | 707/103 |

FOREIGN PATENT DOCUMENTS

| | | |
|---|---|---|
| 0751651 | 1/1997 | European Pat. Off. . |
| 08249282 | 9/1996 | Japan . |
| 2 313 744 | 12/1997 | United Kingdom . |
| WO 97/06499 | 2/1997 | WIPO . |

OTHER PUBLICATIONS

PCT International Search Report, Apr. 1, 1999, PCT/SE 98/02252.

Alvah B. Davis, et al., "Management of Cellular Fraud: Knowledge–Based Detection, Classification and Prevention", Int. Conf. Artificial Intelligence Expert Systems Natural, vol. 2, Jan. 1, 1993, pp. 155–164.

PowerBuilder, Function Reference, p. 2 (date unknown).

Sybase, Open Client DB—Library/C, Reference Manual, Release 4.2, pp. 1 to 3, 2–18 through 2–20, 2–50 through 2–51 and 2–127 through 2–128, (May, 1990).

Sybase, Commands Reference, Unix Utilities, Release 4.0, pp. 4–3 through 4–9 (May 1989).

*Primary Examiner*—Thomas G. Black
*Assistant Examiner*—Diane D. Mizvahi
*Attorney, Agent, or Firm*—Jenkens & Gilchrist P.C.

[57] ABSTRACT

A client sends a first message (such as a stored procedure function call) to a server relational database identifying notifications concerning database access related events of interest. Responsive to this first message, logic within the server relational database monitors instances of database accesses, determines whether any of those accesses relate to events of interest, and then stores those determined events. The client also sends a second message (such as blocking stored procedure function call) requesting that it be notified of any stored events of interest. Responsive to this second message, the logic within the server relational database checks to see whether any events have been stored, sends a notification message containing an identification of those stored events to the client, and then clears the stored events. These notifications concerning external events of interest may then be processed by a service management application executed within the client.

18 Claims, 1 Drawing Sheet

IMPLEMENTATION OF NOTIFICATION CAPABILITIES IN RELATIONAL DATABASES

BACKGROUND OF THE INVENTION

1. Technical Field of the Invention

The present invention relates to relational databases and, in particular, to a mechanism for supporting the generation by a server relational database, and the sending from that server relational database to a client, of a notification regarding accesses to the database indicative of the occurrence of certain events of interest.

2. Description of Related Art

A database is a collection of data structured and organized in a disciplined fashion that makes stored information of interest quickly accessible. When a database is organized and accessed according to relationships between stored data items, it is referred to as a relational database. In a simple implementation, a relational database comprises a collection of data files that relate to each other through at least one common field. It is possible, however, that the relational database supports many common field relationships between the stored data files.

An example of a complex relational database is a home location register (HLR) implemented within a wireless telecommunications network (such as a cellular telephone network). The home location register stores permanent and temporary data concerning subscribers to the wireless telecommunications network. The permanent data stored in the home location register comprises fixed information such as subscriber data (relating to subscriptions, services, pass codes, serial numbers, and the like), authentication data, and numbering plan data. The temporary data stored in the home location register comprises variable information such as an identification of the current location of each subscriber.

A customer administrative system (CAS) is utilized to engage in transactions relating to the administration of the permanent data stored in the home location register. These administration activities, in general, relate to transactions performed for the purposes of customer (i.e., subscriber) creation or definition, service activation, and the like, relating to a given customer. More particularly, the transactions relate to subscriber data administration tasks such as:

subscription initiation/removal/status,
  subscriber activation/cancellation,
  service provision/withdrawal/activation/passivation,
  C-number (transfer) definition,
  pass code changes, and
  serial number changes.

The transactions may further relate to authentication administration tasks such as authentication activation/change/deactivation/status. Additionally, the transactions relate to numbering plan configuration including number range assignment, numbering plan deletion and numbering plan viewing.

In order to support certain service management applications executed in the customer administrative system, it is important that telecommunications network activity related event notifications be generated for delivery to and processing by the customer administrative system. For example, a fraud detection application may be executed in the customer administrative system for the purpose of detecting fraudulent subscription use. In such a case, a notification must be provided to the customer administrative system at each instance where a call is made from a certain subscriber mobile station or billed to a certain subscription. Responsive to this notification, processing and handling of the call could be closely monitored to catch instances of fraudulent use and perhaps prevent such unauthorized calls from being completed.

It is recognized that in many instances the telecommunications network activity related events involve instances where the network nodes access the home location register database. Accordingly, the associated notifications for those telecommunications network activity related events could conveniently be generated by the home location register and sent to the customer administrative system. Unfortunately, current relational database capabilities do not support the generation of notifications based on the occurrence of external events indicated by accesses to the home location register database. It would be advantageous if a mechanism were provided to support the generation by a server relational database (such as a home location register), and the sending from that server relational database to a client (such as a customer administrative system), of a notification regarding accesses to the server relational database indicative of the occurrence of certain external events of interest.

SUMMARY OF THE INVENTION

A client is connected to a server relational database. The server relational database includes logic operating to monitor for database access related events of interest and generate notifications concerning those events for communication to the client. These notifications concerning events of interest may then be processed by a service management application executed within the client. The notification logic responds to a first message (such as a stored procedure function call) which identifies the notifications concerning events of interest to the client by: monitoring over time instances of database accesses, determining whether any of those accesses relate to events of interest to the client, and storing those determined events. The notification logic further responds to a second message (such as blocking stored procedure function call) which requests that it be notified of any stored events by: checking to see whether any events have been stored, and sending a notification message containing an identification of those events to the client.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
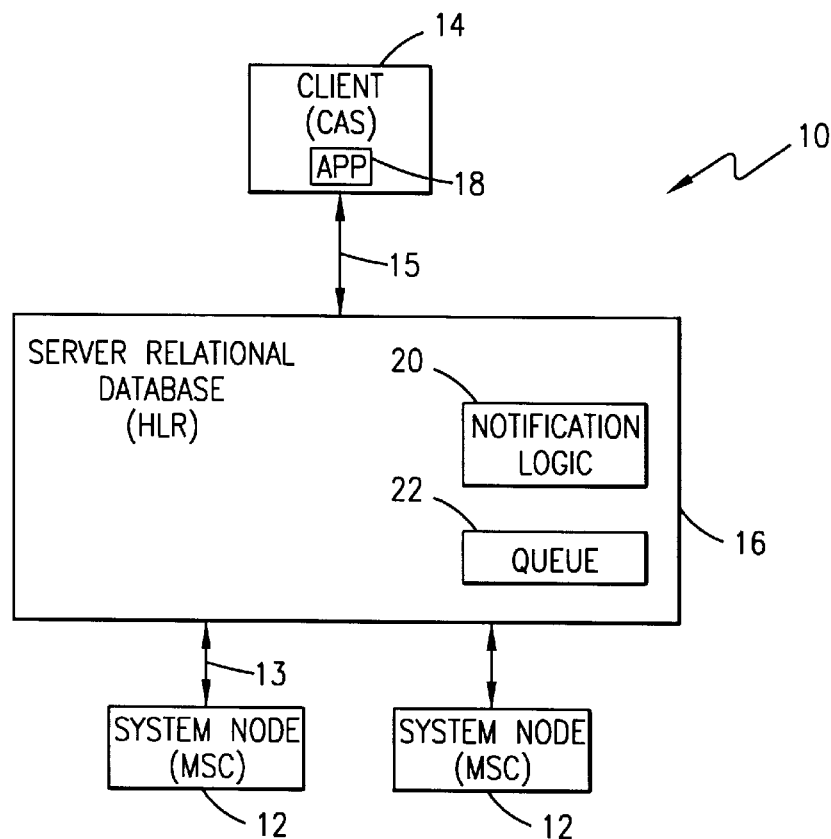
FIG. 1 is a block diagram of a portion of a telecommunications system.

Reference is now made to FIG. 1 wherein there is shown a block diagram of a portion of a client/server system 10 comprising a plurality of system nodes 12, a client 14 and a server relational database 16. The client/server system 10 comprises a wireless (for example, cellular) telecommunications network, and the server relational database 16 comprises a home location register (HLR) database storing permanent and temporary wireless subscriber data. The permanent data stored in the server relational database 16 comprises fixed information concerning the communications service subscripted to by each subscriber. The temporary data stored in the server relational database 16 comprises variable information concerning the current location of each subscriber. The plurality of system nodes 12 comprise mobile switching centers (MSCs) operating to switch telephone calls to and from subscriber mobile stations (not shown) operating within the system 10. The client 14 comprises a customer administrative system (CAS) for the wireless telecommunications network which is utilized to engage in transactions relating to the administration of the permanent data, comprising the subscriber data (concerning subscriptions, services and the like), authentication data and numbering plan data, which is stored in the server relational database 16. The client 14 and server relational database 16 are connected by a communications link 15 preferably comprising a data network such as an X.25 network. The server relational database 16 is connected to each system node 12 by a communications link 13 preferably comprising a signaling network such as a common channel signaling (Signaling System No. 7) network.

In addition to performing its permanent data administration responsibilities with respect to the server relational database 16, the client 14 further executes one or more service management applications 18 directed to managing the services provided by the client/server system 10. For example, in the context of a wireless telecommunications network implementation for the client/server system 10, the service management application 18 may comprise a fraud detection application executed for the purpose of detecting fraudulent use of subscriptions and/or subscriber mobile stations. The service management application 18 relies on receipt of, and further processes, notifications concerning system node 12 events. Referring once again to the fraud detection application example, the service management application 18 needs to be notified of each instance where a call is made from a certain subscriber mobile station (i.e., events implicating billing to a certain subscription). Responsive to such notifications, appropriate processing and system management actions are taken by the service management application 18. In the context of the example fraud detection application, these service management application 18 actions may involve closely monitoring initiated calls being handled by the mobile switching centers to catch instances of fraudulent use and perhaps prevent such unauthorized calls from being completed.

The notifications required by the service management application 18 may be generated by the system nodes 12 themselves in response to events of interest, and sent directly to the client 14. This solution, however, is not favored as it would require programming the system nodes 12 to not only recognize the events, but also generate the appropriate notification. The solution is further undesirable as it would require the establishment and maintenance of a communications link connection between the system nodes 12 and the client 14 for the purpose of supporting transportation of the generated notifications.

The present invention recognizes that many, if not all, of these events of interest to the service management application 18 implicate a system node 12 accessing of the data files stored in the server relational database 16. For example, again referring to the fraud detection application, each call originated by or terminated at a mobile station comprises an event of interest to the service management application 18, and this event implicates an accessing and retrieval of information (such as location information) stored in the home location register. It would be more efficient to take advantage of the fact that the server relational database 16 is implicated in system node 12 events of interest, and have the server relational database, rather than the system node, generate the event notification for communication to the client 14 and its service management application 18.

The server relational database 16 includes notification logic 20 operating to monitor for system node 12 events and generate notifications concerning those events for communication to the client 14 and its service management applications 18. The notification logic 20 receives a first message from the client 14 identifying the notifications concerning system node 12 events that it would like to receive. This first message may, for example, comprise a stored procedure function call understood by all standard query language (SQL) type databases. Responsive to this first message, the notification logic 20 continues over time to monitor instances of system node 12 accessing of the server relational database 16, determine whether any of those accesses relate to events identified as being of interest to the client 14, and then store those determined events in a queue 22. The notification logic 20 further receives a second message from the client 14 requesting that notification concerning any queue 22 stored events of interest be sent back to the client. This second message may, for example, comprise a blocking stored procedure function call understood by all standard query language (SQL) type databases. Responsive to this second message, the notification logic 20 checks the current state of the queue 22, and if any events have been stored, a notification message containing an identification of those events is sent to the client 14. The queue 22 is then cleared of the reported events to make room for subsequently detected events of interest to the client. If no events have been stored in the queue 22 at the time of receipt of the second message, the notification logic 20 waits for the storage in the queue 22 of an event identified as being of interest to the client 14, and then sends a notification message containing an identification of that event to the client. The queue 22 is then cleared to make room for subsequently detected events of interest to the client. Whenever a determination is thereafter made to revise the events of interest to the client 14, a new first message is sent from the client to the server relational database 16 identifying the revised notifications concerning system node 12 events that it would like to receive.

Figure 2:
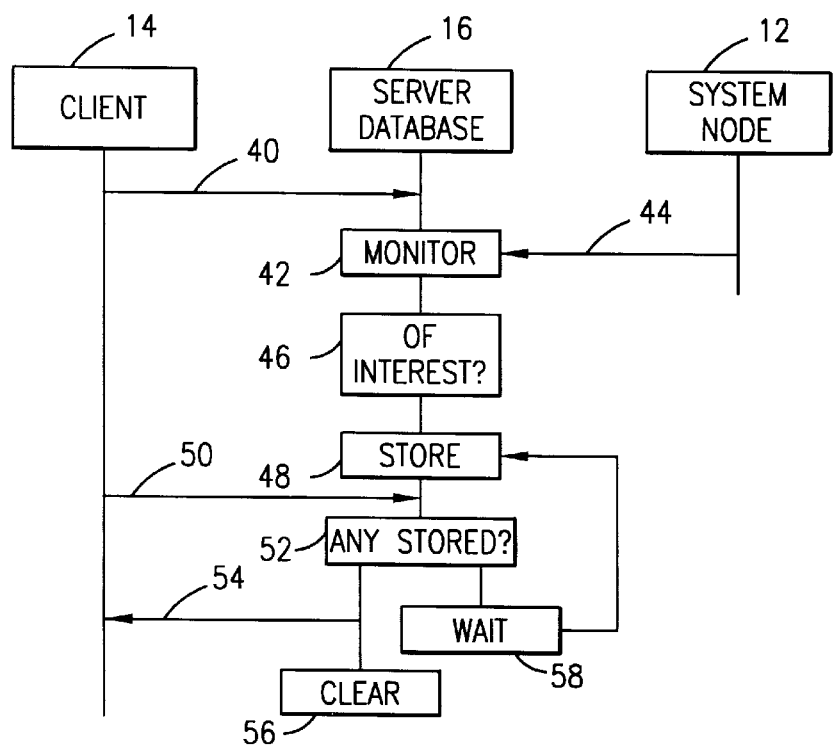
FIG. 2 is a nodal operation and signal flow diagram illustrating a present invention operation for the generation of external event notifications by a relational database.

Reference is now made to FIG. 2 wherein there is shown a nodal operation and signal flow diagram illustrating a present invention operation for the generation of external event notifications by a relational database. The client 14 sends a first message 40 (such as a stored procedure function call) to the server relational database 16 identifying the notifications concerning system node 12 events that it would like to receive. This identification of events of interest remains in effect until such time as a subsequent first message 40 is sent to the server relational database 16 identifying the revised notifications concerning system node 12 events that the client 14 would like to receive. Responsive to this first message 40, the server relational database 16 (in particular the notification logic 20 of FIG. 1) continues over time to monitor (action 42) instances of system node 12 accessing 44 of the server relational database 16, determine (action 46) whether any of those accesses relate to events identified as being of interest to the client 14, and then store (action 48) those events of interest in the queue 22. The client 14 further sends (at some point in time not necessarily subsequent to the actions 42, 46 and 48) to the server relational database 16 a second message 50 (such as blocking stored procedure function call) requesting that notification concerning any stored events of interest be sent back to the client. Responsive to this second message 50, the server relational database 16 (in particular the notification logic 20 of FIG. 1) checks to see whether any events have been stored (action 52), and if events have been stored sends a notification message 54 containing an identification of those events to the client 14. The stored events are then cleared (action 56) to make room for subsequently detected events of interest to the client 14. If no events have been stored at the time of receipt of the second message, the server relational database 16 waits (action 58) for the storage (action 48) of an event identified as being of interest to the client 14. The procedure as before then continues with the sending of a notification message 54 containing an identification of the event to the client 14, followed by the clearing (action 56) of the stored event.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system, comprising:
    a client; and
    a server relational database including logic operating to monitor for accesses to the server relational database indicative of events of interest and generate notifications concerning those events of interest for communication to the client, said logic functioning to:
        receive a first message from the client including an identification of events of interest to the client;
        determine whether monitored accesses to the server relational database are indicative of the identified events of interest to the client;
        receive a second message from the client requesting that the client be notified of any determined events of interest; and
        send a notification to the client containing an identification of those determined events of interest.

2. The system as in claim 1 wherein the logic function to determine further functions to wait for the determination of an event of interest to the client when no events of interest have previously been determined.

3. The system as in claim 1 wherein the logic function to determine further functions to store any determined events of interest to the client.

4. The system as in claim 1 wherein the logic of the server relational database further functions to clear determined events of interest from a storage queue following notification.

5. The system as in claim 1 wherein the first message comprises a first type stored procedure function call understood by the server relational database.

6. The system as in claim 5 wherein the second message comprises a second type stored procedure function call understood by the server relational database.

7. The system as in claim 1 further including a service management application executed by the client to process the notifications concerning those events of interest received from the logic of the server relational database.

8. The system as in claim 1 wherein the client comprises a customer administrative system operating to support telecommunications data definition within the server relational database.

9. The system as in claim 8 wherein the server relational database comprises a home location register of a telecommunications network, and wherein the accesses made to the home location register originate from nodes within the telecommunications network.

10. A method for notifying a client of events of interest indicated by accesses to a server relational database, comprising the steps of:
    receiving a first message from the client including an identification of events of interest to the client;
    monitoring for accesses to the server relational database;
    determining whether the monitored accesses are indicative of identified events of interest;
    receiving a second message from the client requesting that the client be notified of any determined events of interest; and
    sending a notification to the client containing an identification of those determined events of interest.

11. The method as in claim 10 further including the step of clearing determined events of interest from a storage queue following sending of the notification.

12. The method as in claim 10 wherein the step of determining further includes the step of waiting for the monitoring of an event of interest to the client when no events of interest have previously been determined.

13. The method as in claim 10 wherein the step of determining further comprises the step of storing any determined events of interest to the client.

14. The method as in claim 10 wherein the first message comprises a first type stored procedure function call understood by the server relational database.

15. The method as in claim 14 wherein the second message comprises a second type stored procedure function call understood by the server relational database.

16. The method as in claim 10 further including the step of executing a service management application by the client to process the notifications concerning those events of interest received from the server relational database.

17. The method as in claim 10 wherein the client comprises a customer administrative system operating to support telecommunications data definition within the server relational database.

18. The method as in claim 17 wherein the server relational database comprises a home location register of a telecommunications network, and wherein the accesses made to the home location register originate from nodes within the telecommunications network.

* * * * *